(No Model.)

E. B. WEED.
HONEY COMB FOUNDATION MACHINE.

No. 283,442. Patented Aug. 21, 1883.

Witnesses:
E. J. Scully
John Baker

Inventor:
E. Beverly Weed
A. Barthel
Att'y

UNITED STATES PATENT OFFICE.

E. BEVERLY WEED, OF DETROIT, MICHIGAN.

HONEY-COMB-FOUNDATION MACHINE.

SPECIFICATION forming part of Letters Patent No. 283,442, dated August 21, 1883.

Application filed December 29, 1882. (No model.)

*To all whom it may concern:*

Be it known that I, E. BEVERLY WEED, of Detroit, county of Wayne, State of Michigan, have invented an Improvement in Machines for Making Honey-Comb Foundation, of which the following is a specification.

The object of my improvement is to construct a machine which will be capable of molding the sheet-wax into comb-foundation with high walls—that is to say, with the cells completed as high, or nearly so, as in the completed natural formation by the bees themselves.

Experience has demonstrated that bees will readily use such perfect artificial cell-formations if the wax is soft; but owing to practical difficulties such perfected artificial cell-formations could not be obtained by any of the present foundation-machines, which are only capable of producing what is termed "comb-foundation," and wherein the cell-base is the only perfect part, leaving the cell-walls quite low and incomplete. In all such foundation-machines a sheet of wax is passed in a plastic state through die-rolls, which give it the desired impression; but owing to the difficulty of extricating the impressed wax from the die-rolls the cell-walls could only be formed very low and rudimentary.

By a peculiar construction and arrangement of my die-rolls I have overcome the aforementioned difficulty, and my machine is capable of producing a comb-foundation with the walls in any desired state of perfection; and my invention consists, first, in constructing my die-rolls with undercut cell-formers; second, in covering them with a substance adhesive to water, which prevents the wax from sticking to the dies; the substance I use is what is called "dental rubber;" third, in arranging the die-rolls so as to have them both partially immersed in water.

Figure 1:
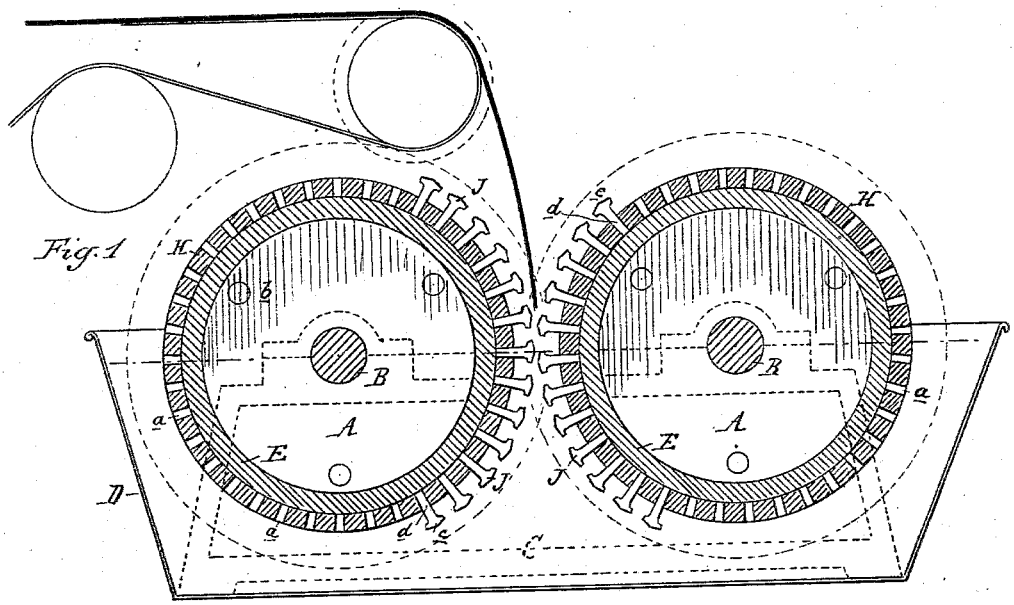
Figures 2, 3:
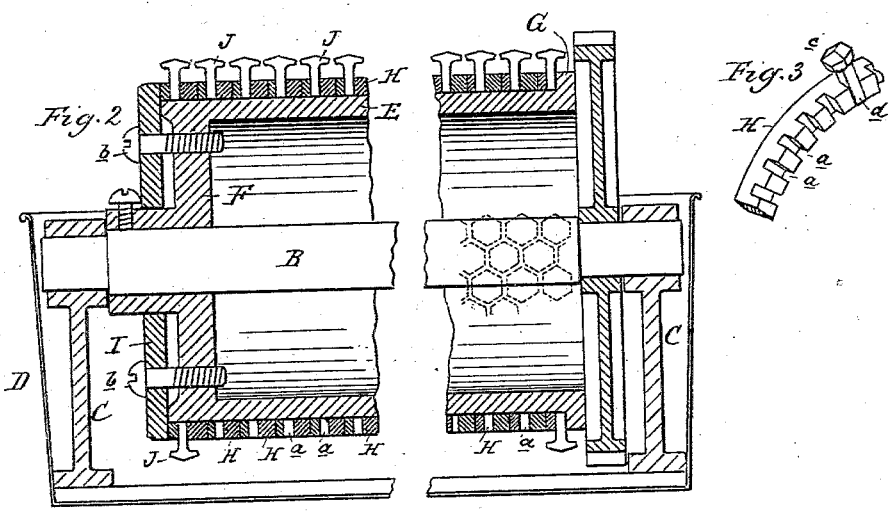
Figure 4:
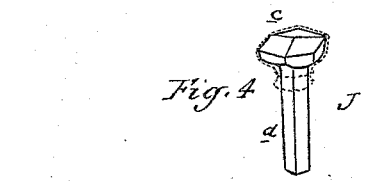

In the drawings, which form a part of this specification, Figure 1 is a vertical section of my machine taken at right angles to the axis of the die-rolls. Fig. 2 is a longitudinal vertical section of one of the die-rolls. Fig. 3 is a detached perspective of a portion of one of the rings. Fig. 4 is a detached perspective of one of the cell-dies.

A represents two die-rolls precisely alike, and each mounted upon shafts B, which rest upon their ends in suitable bearings in a frame, C.

D represents a pan into which the whole device is set.

The construction of the die-rolls is as follows: E is the body of the roll. It is provided at one end with a head, F, cast integral therewith, and upon the opposite end with an annular flange, G. H are a number of like rings fitting snugly over the roll E, and each of them is provided upon one side with a series of radial grooves, *a*.

I is a loose head fitting against the head F of the roll, to which it is secured by the screws *b*, thereby forming the means for keeping the rings H and dies J securely in place upon the rolls.

J are a number of individual metal dies or cell-formers, each consisting of the head *c* and shank *d*, the latter of which is of proper size to fit into the grooves *a*. The head *c* is upon its outer face of the well-known shape and size required for the formation of the cell-base. The sides of the head are pyramidally inclined or contracted and then cut away to the thickness of the shank, leaving no more metal on the head than is required to make it substantial enough for practical purposes, a considerable undercut portion intervening between the head proper and the face of the roll. Each of these cell-dies is covered with a thin sheet or coating of what is called "dental rubber," which has the property of being adhesive to water.

A thin sheet of such rubber may be simply stretched over each head of the cell-dies and tied fast under it with a string or wire, or an adhesive coating of it may be formed over the head of the dies.

The rings H are so arranged upon the rolls that the grooves *a* of one alternate with the ones next to it, so that the die-formers stuck into these grooves will form a die-roll showing the well-known honey-comb foundation, leaving the necessary interstices around the sides of the die-heads to allow the wax to enter and form cell-walls. The dies are firmly held from displacement by pressing the rings H together, which is done by tightening the screws *b* after the dies are put in place.

The two die-rolls A are constructed perfectly alike, and they are provided with means for rotating them simultaneously in opposite direction, which is done in the usual way by intermeshing gear-wheels upon the ends of their shafts. The rolls are also set, as heretofore, the necessary distance apart, and so as to bring the counterparts of their faces in direct juxtaposition, with this difference, however, that in my machine the rolls are upon the same horizontal plane, instead of one above another, as in other machines.

In practice, the pan D is filled with cold water and the wax sheet is fed direct from the sheeting-machine, (which I have described in a separate application,) in a plastic state, between the die-rolls, as shown in Fig. 1, when it is pressed between the dies into the comb-foundation and then delivered at the rear end of the machine. The die-rolls have to revolve with the same speed with which the sheet is fed to them.

It will be observed that in my machine the die-rolls revolve aside of each other. In former machines this arrangement could not be adopted, as it was found impossible to extricate the comb-foundation otherwise than by running the sheet horizontally through the rolls. With my arrangement I gain the great advantage of having both rolls partially submerged and kept thereby constantly cooled and lubricated with water, and owing to the undercut shape of my cell-dies and their water-adhesive covering I can make comb-foundation with high walls, lead the sheet partially around one roll, and still have it discharge easily from the same.

As before stated, my rolls are only kept lubricated by the water of the pan. Other machines have to use soap-suds, which is prejudicial to the product obtained. The covering of the dies with dental rubber keeps their surfaces constantly covered with a thin film of water, which excludes any possibility of sticking, and as the dies are also well undercut it is obvious that my machine can take advantage of the plastic nature of the wax to its full extent.

What I claim as my invention is—

1. In a foundation-machine, a set of die-rolls formed with undercut cell-dies, substantially as and for the purpose specified.

2. In a foundation-machine, the cell-dies covered with a sheet or film of dental rubber, substantially as and for the purpose specified.

3. In a foundation-machine, the die-rolls arranged on a horizontal plane, in combination with the pan D, in which they revolve, substantially as and for the purpose specified.

4. In a foundation-machine, die-rolls formed by a number of individual radial cell-dies secured to the roll, substantially as described.

5. In a foundation-machine, the individual cell-dies J, provided with shanks *d* and undercut heads *c*, in combination with the grooved rings H, substantially as described.

6. In a foundation-machine, the combination of the roll E, grooved rings H, heads F I, and screws *b*, substantially as and for the purpose described.

E. BEVERLY WEED.

Witnesses:
 A. B. WEED,
 WILL W. TRACY.